(12) United States Patent
Sasano et al.

(10) Patent No.: US 11,582,944 B2
(45) Date of Patent: *Feb. 21, 2023

(54) ABSORBENT SHEET FOR PETS

(71) Applicant: UNICHARM CORPORATION, Ehime (JP)

(72) Inventors: Yasuhiro Sasano, Kanonji (JP); Satoshi Hasegawa, Edgewater, NJ (US); Takeshi Ikegami, Fort Lee, NJ (US)

(73) Assignee: UNICHARM CORPORATION, Ehime (JP)

(*) Notice: Subject to any disclaimer, the term of this patent is extended or adjusted under 35 U.S.C. 154(b) by 209 days.

This patent is subject to a terminal disclaimer.

(21) Appl. No.: 16/622,443

(22) PCT Filed: Feb. 21, 2018

(86) PCT No.: PCT/JP2018/006306
§ 371 (c)(1),
(2) Date: Dec. 13, 2019

(87) PCT Pub. No.: WO2018/230047
PCT Pub. Date: Dec. 20, 2018

(65) Prior Publication Data
US 2020/0100453 A1 Apr. 2, 2020

(30) Foreign Application Priority Data

Jun. 15, 2017 (JP) .............................. JP2017-118129

(51) Int. Cl.
*A01K 1/015* (2006.01)
*B32B 3/04* (2006.01)
(Continued)

(52) U.S. Cl.
CPC .............. *A01K 1/0157* (2013.01); *B32B 3/04* (2013.01); *B32B 3/263* (2013.01); *B32B 3/30* (2013.01);
(Continued)

(58) Field of Classification Search
None
See application file for complete search history.

(56) References Cited

U.S. PATENT DOCUMENTS 3,221,738 A * 12/1965 Ekberg .................. A61F 13/512
604/382
3,403,681 A * 10/1968 Hoey ................ A61F 13/15731
604/383
(Continued)

FOREIGN PATENT DOCUMENTS

CN 1644037 A 7/2005
CN 201577383 U * 9/2010
(Continued)

OTHER PUBLICATIONS

Machine Translation of JP-11189961-A, Jul. 1999 (Year: 1999).*
(Continued)

*Primary Examiner* — Jeffrey A Vonch
(74) *Attorney, Agent, or Firm* — Fredrikson & Byron, P.A.

(57) ABSTRACT the absorbent sheet for pets which can suppress the outflow of a functional material is provided. An absorbent sheet (10) for pets includes a topsheet (12), a backsheet (14), an absorber (20) provided between the topsheet and the backsheet, a functional (40) material, and a recess (50)that is recessed in a direction from the topsheet toward the backsheet. The functional material (40) is provided at a position of the recess (50).

14 Claims, 2 Drawing Sheets

(51) Int. Cl.
  *B32B 3/30* (2006.01)
  *B32B 5/02* (2006.01)
  *B32B 27/12* (2006.01)
  *B32B 5/14* (2006.01)
  *B32B 3/26* (2006.01)
  *B32B 3/06* (2006.01)

(52) U.S. Cl.
  CPC .............. *B32B 5/022* (2013.01); *B32B 5/142* (2013.01); *B32B 27/12* (2013.01); *B32B 3/06* (2013.01); *B32B 5/145* (2013.01); *B32B 2307/402* (2013.01); *B32B 2307/726* (2013.01); *B32B 2307/728* (2013.01); *B32B 2307/73* (2013.01); *B32B 2471/04* (2013.01); *Y10T 428/2462* (2015.01); *Y10T 428/24215* (2015.01); *Y10T 428/24331* (2015.01); *Y10T 428/24479* (2015.01); *Y10T 428/24603* (2015.01); *Y10T 428/24612* (2015.01); *Y10T 428/24777* (2015.01); *Y10T 428/24851* (2015.01); *Y10T 428/24942* (2015.01)

(56) References Cited

U.S. PATENT DOCUMENTS

| | | | | |
|---|---|---|---|---|
| 3,684,641 | A * | 8/1972 | Murphy | B32B 38/145 428/207 |
| 3,918,454 | A * | 11/1975 | Korodi | A61F 13/42 604/361 |
| 4,397,644 | A * | 8/1983 | Matthews | A61F 13/53418 604/378 |
| 4,435,178 | A * | 3/1984 | Fitzgerald | A61F 13/53756 604/379 |
| 4,443,512 | A * | 4/1984 | Delvaux | A61F 13/51104 428/162 |
| 4,623,340 | A * | 11/1986 | Luceri | A61F 13/51104 604/378 |
| 5,069,676 | A * | 12/1991 | Ito | A61F 13/536 604/378 |
| 5,128,193 | A * | 7/1992 | Anapol | A61F 13/533 428/913 |
| 5,595,754 | A * | 1/1997 | Ito | G01N 33/52 604/358 |
| 5,833,679 | A * | 11/1998 | Wada | A61F 13/533 604/385.01 |
| 5,834,099 | A * | 11/1998 | Steinhardt | D21H 27/32 428/192 |
| 6,227,145 | B1 * | 5/2001 | Miyamoto | A01K 1/0107 604/378 |
| 6,244,216 | B1 * | 6/2001 | Ochi | A01K 1/0157 119/169 |
| 6,284,942 | B1 * | 9/2001 | Rabin | A61F 13/42 604/385.01 |
| 6,532,897 | B1 | 3/2003 | Adolfsson et al. | |
| 6,675,702 | B1 * | 1/2004 | Maksimow | D04H 1/44 100/41 |
| 6,719,742 | B1 * | 4/2004 | McCormack | A61F 13/51496 604/385.01 |
| 6,780,270 | B2 * | 8/2004 | Andersson | B31F 1/07 156/209 |
| 6,867,345 | B2 * | 3/2005 | Shimoe | A61F 13/4704 604/385.01 |
| 7,276,053 | B1 * | 10/2007 | Lariviere | A61F 13/15577 604/385.01 |
| 7,678,221 | B2 | 3/2010 | Takahashi et al. | |
| 7,772,457 | B2 | 8/2010 | Ohtsuka et al. | |
| 9,132,048 | B2 | 9/2015 | Matsushita et al. | |
| 2001/0008683 | A1 * | 7/2001 | Takai | D04H 1/542 428/196 |
| 2001/0031953 | A1 * | 10/2001 | Taneichi | A61F 13/534 604/366 |
| 2002/0062115 | A1 * | 5/2002 | Wada | A61F 13/84 604/385.01 |
| 2002/0143312 | A1 * | 10/2002 | Graeme, III | A61F 13/51104 604/385.01 |
| 2002/0198508 | A1 * | 12/2002 | Takatera | B32B 5/24 604/383 |
| 2003/0078553 | A1 * | 4/2003 | Wada | A61F 13/5513 604/385.01 |
| 2003/0114818 | A1 * | 6/2003 | Benecke | A61F 13/5116 604/378 |
| 2003/0139719 | A1 * | 7/2003 | Nanaumi | A61F 13/533 604/374 |
| 2003/0154904 | A1 * | 8/2003 | Klofta | A61F 13/42 116/206 |
| 2003/0158530 | A1 * | 8/2003 | Diehl | A61F 13/42 604/362 |
| 2003/0166293 | A1 * | 9/2003 | Kritzman | A61F 13/42 435/12 |
| 2004/0116884 | A1 * | 6/2004 | Fujii | A61F 13/536 604/367 |
| 2004/0142151 | A1 | 7/2004 | Toyoshima et al. | |
| 2004/0170813 | A1 * | 9/2004 | Digiacomantonio | B32B 5/022 604/385.01 |
| 2004/0182261 | A1 * | 9/2004 | Fernfors | B41F 19/02 101/125 |
| 2004/0258886 | A1 * | 12/2004 | Maciag | D21H 27/02 428/156 |
| 2004/0265544 | A1 * | 12/2004 | Di Salvo | A61F 13/145 428/173 |
| 2005/0166855 | A1 * | 8/2005 | Kaneko | A01K 1/0107 119/169 |
| 2005/0166856 | A1 * | 8/2005 | Kaneko | A01K 1/0107 119/169 |
| 2005/0182374 | A1 * | 8/2005 | Zander | A61F 13/533 604/380 |
| 2006/0041239 | A1 * | 2/2006 | Nagahara | A61F 13/15203 604/380 |
| 2006/0058761 | A1 * | 3/2006 | Kudo | A61F 13/4704 604/385.101 |
| 2006/0089071 | A1 * | 4/2006 | Leidig | B29C 65/08 156/60 |
| 2006/0105075 | A1 * | 5/2006 | Otsubo | A61F 13/15626 425/363 |
| 2006/0111684 | A1 * | 5/2006 | Berba | A61F 13/51496 604/385.01 |
| 2006/0122569 | A1 * | 6/2006 | Drevik | A61F 13/15699 604/385.101 |
| 2006/0129114 | A1 * | 6/2006 | Mason, Jr. | A61F 13/472 604/361 |
| 2006/0142710 | A1 * | 6/2006 | Kigata | A61F 13/4751 604/385.04 |
| 2006/0200104 | A1 * | 9/2006 | Kaneko | A01K 1/0107 604/358 |
| 2006/0200105 | A1 * | 9/2006 | Takahashi | A01K 1/0107 604/360 |
| 2006/0229577 | A1 * | 10/2006 | Roe | A61F 13/42 604/361 |
| 2006/0260556 | A1 * | 11/2006 | Renforth | A01K 1/0107 119/169 |
| 2007/0079748 | A1 * | 4/2007 | Ahmed | A61L 15/60 116/206 |
| 2007/0087169 | A1 * | 4/2007 | McFall | A61F 13/5116 428/172 |
| 2007/0093770 | A1 * | 4/2007 | Ecker | A61F 13/4758 604/385.01 |
| 2007/0107662 | A1 * | 5/2007 | Queen | A47G 27/0206 119/28.5 |
| 2007/0129699 | A1 * | 6/2007 | Ohtsuka | A61F 13/533 604/368 |
| 2008/0091156 | A1 * | 4/2008 | Maldonado | A61F 13/51496 604/385.01 |
| 2008/0234644 | A1 * | 9/2008 | Hansson | A61L 15/56 604/360 |
| 2008/0269704 | A1 * | 10/2008 | Hansson | B32B 27/20 604/366 |
| 2008/0281287 | A1 * | 11/2008 | Marcelo | A61F 13/4756 604/383 |

(56) References Cited

U.S. PATENT DOCUMENTS

| | | | |
|---|---|---|---|
| 2008/0294140 A1* | 11/2008 | Ecker | A61F 13/51104 604/385.01 |
| 2009/0000557 A1* | 1/2009 | Takahashi | A01K 1/0107 119/161 |
| 2009/0000561 A1* | 1/2009 | Takahashi | A01K 1/0107 119/171 |
| 2009/0281513 A1* | 11/2009 | Nelson | A61F 13/511 604/379 |
| 2010/0036351 A1* | 2/2010 | Larson | A61F 13/511 604/385.01 |
| 2010/0168695 A1* | 7/2010 | Robles | A61F 13/42 604/361 |
| 2010/0168699 A1* | 7/2010 | Robles | A61F 13/42 604/385.01 |
| 2011/0046592 A1* | 2/2011 | Nishikawa | A61F 13/511 156/219 |
| 2011/0060301 A1* | 3/2011 | Nishikawa | A61F 13/15699 604/358 |
| 2011/0104459 A1* | 5/2011 | Arora | G03C 1/73 156/60 |
| 2011/0152805 A1* | 6/2011 | Gil | A61F 13/42 524/378 |
| 2011/0260371 A1* | 10/2011 | Arora | B41M 5/28 264/495 |
| 2011/0262653 A1* | 10/2011 | Arora | B41M 5/285 427/532 |
| 2011/0264064 A1* | 10/2011 | Arora | B41M 5/34 604/367 |
| 2012/0004633 A1* | 1/2012 | R. Marcelo | A61F 13/4756 604/378 |
| 2012/0143158 A1* | 6/2012 | Yang | A61F 13/533 604/378 |
| 2012/0253308 A1* | 10/2012 | Misiti | A61F 13/51394 604/385.01 |
| 2013/0178811 A1* | 7/2013 | Kikuchi | A61F 13/49 604/379 |
| 2013/0237944 A1* | 9/2013 | Yamanaka | A61F 13/533 604/385.31 |
| 2014/0044934 A1* | 2/2014 | Bills | B32B 5/26 428/196 |
| 2014/0087181 A1* | 3/2014 | Klofta | C09D 11/50 428/347 |
| 2014/0090608 A1* | 4/2014 | Komatsubara | A01K 23/00 119/869 |
| 2014/0228795 A1* | 8/2014 | Castanares | A61F 13/51394 604/385.01 |
| 2014/0261208 A1* | 9/2014 | Calimano | A01K 1/0107 119/161 |
| 2014/0296815 A1* | 10/2014 | Takken | A61F 13/5122 604/383 |
| 2014/0303581 A1* | 10/2014 | Karlsson | A61F 13/472 604/361 |
| 2014/0343526 A1* | 11/2014 | Knapmeyer | D04H 1/43828 428/196 |
| 2014/0349056 A1 | 11/2014 | Sartini et al. | |
| 2015/0080837 A1* | 3/2015 | Rosati | A61F 13/45 604/385.101 |
| 2015/0112293 A1* | 4/2015 | Gust | A61F 13/15699 604/385.01 |
| 2015/0164041 A1* | 6/2015 | Takahashi | A01K 1/0157 119/161 |
| 2015/0265477 A1* | 9/2015 | Joseph | A61F 13/8405 604/361 |
| 2015/0320009 A1* | 11/2015 | Sasano | A01K 1/0107 119/161 |
| 2015/0334985 A1* | 11/2015 | Takahashi | A01K 1/0107 119/171 |
| 2016/0074258 A1* | 3/2016 | Rosati | A61F 13/55145 604/378 |
| 2016/0113826 A1* | 4/2016 | Liu | A61F 13/84 604/367 |
| 2016/0278986 A1* | 9/2016 | Gross | A61F 13/537 |
| 2016/0346136 A1* | 12/2016 | Strasemeier | A61F 13/49 |
| 2017/0333263 A1* | 11/2017 | Tashiro | A61F 13/53717 |
| 2017/0333265 A1* | 11/2017 | Hanao | A61F 13/533 |
| 2018/0256415 A1* | 9/2018 | Miao | A61F 13/533 |
| 2018/0318148 A1* | 11/2018 | Joshi | A61F 13/84 |
| 2018/0338468 A1* | 11/2018 | Takahashi | A01K 1/0157 |
| 2019/0046362 A1* | 2/2019 | Yamada | D21H 27/38 |
| 2019/0060139 A1* | 2/2019 | Nagashima | A61F 13/51108 |
| 2019/0060141 A1* | 2/2019 | Di Berardino | A61F 13/15731 |
| 2019/0247246 A1* | 8/2019 | Yamaguchi | A61F 13/533 |
| 2019/0336358 A1* | 11/2019 | Goda | A61F 13/51394 |
| 2020/0060893 A1* | 2/2020 | Yonaha | A61F 13/51108 |
| 2020/0107518 A1* | 4/2020 | Hiroshima | A01K 1/0107 |
| 2020/0120894 A1* | 4/2020 | Sasano | B32B 5/022 |
| 2020/0187451 A1* | 6/2020 | Onishi | A01K 1/0107 |
| 2020/0246200 A1* | 8/2020 | Oda | A61F 13/51121 |
| 2020/0281155 A1* | 9/2020 | Axelrod | B32B 27/32 |
| 2020/0288665 A1* | 9/2020 | Sasano | A01K 1/0157 |
| 2021/0169038 A1* | 6/2021 | Okawa | A01K 1/0157 |

FOREIGN PATENT DOCUMENTS

| | | | | |
|---|---|---|---|---|
| CN | 103476248 A | | 12/2013 | |
| CN | 104411159 A | | 3/2015 | |
| CN | 104853598 A | | 8/2015 | |
| CN | 104918480 A | | 9/2015 | |
| CN | 106614016 A | * | 5/2017 | |
| EP | 1048206 A2 | | 11/2000 | |
| EP | 1048206 A2 | * | 11/2000 | ........... A01K 1/0107 |
| JP | 11189961 A | | 7/1999 | |
| JP | 11189961 A | * | 7/1999 | |
| JP | 2000225145 A | | 8/2000 | |
| JP | 20018568 A | | 1/2001 | |
| JP | 2001181420 A | | 7/2001 | |
| JP | 2001218535 A | * | 8/2001 | |
| JP | 2001352852 A | * | 12/2001 | |
| JP | 2002315461 A | * | 10/2002 | |
| JP | 2003310073 A | * | 11/2003 | ............. B32B 29/00 |
| JP | 2005152241 A | | 6/2005 | |
| JP | 2006238744 A | | 9/2006 | |
| JP | 2006238745 A | | 9/2006 | |
| JP | 2008237185 A | * | 10/2008 | |
| JP | 2008237382 A | * | 10/2008 | ......... A61F 13/5323 |
| JP | 2011104014 A | * | 6/2011 | |
| JP | 2011130797 A | * | 7/2011 | |
| JP | 2011177167 A | * | 9/2011 | |
| JP | 2011205970 A | | 10/2011 | |
| JP | 2011205970 A | * | 10/2011 | |
| JP | 2012029624 A | * | 2/2012 | |
| JP | 2012029625 A | * | 2/2012 | |
| JP | 2012050405 A | * | 3/2012 | |
| JP | 2012075333 A | * | 4/2012 | |
| JP | 2012179220 A | * | 9/2012 | ......... A61F 13/5323 |
| JP | 2012187033 A | * | 10/2012 | |
| JP | 2012213337 A | * | 11/2012 | |
| JP | 2012213337 A | | 11/2012 | |
| JP | 2012213338 A | * | 11/2012 | |
| JP | 2013179858 A | | 9/2013 | |
| JP | 2013179902 A | * | 9/2013 | |
| JP | 2013220286 A | * | 10/2013 | |
| JP | 2013252331 A | * | 12/2013 | |
| JP | 2014045956 A | * | 3/2014 | |
| JP | 2014097241 A | | 5/2014 | |
| JP | 2015073775 A | * | 4/2015 | |
| JP | 2015112268 A | | 6/2015 | |
| JP | 2016214407 A | * | 12/2016 | |
| JP | 2017018287 A | * | 1/2017 | ............ A61F 13/511 |
| JP | 2017077402 A | * | 4/2017 | |
| KR | 2009046623 A | * | 5/2009 | ............ A01K 1/0107 |
| WO | WO-2005095713 A1 | * | 10/2005 | ............. B32B 29/00 |
| WO | 2012043546 A1 | | 4/2012 | |
| WO | WO-2018207439 A1 | * | 11/2018 | ............. A61F 13/15 |

OTHER PUBLICATIONS

Machine Translation of JP-2011130797-A, Jul. 2011 (Year: 2011).*

Machine Translation of JP-2011205970-A, Oct. 2011 (Year: 2011).*

(56) References Cited

OTHER PUBLICATIONS

Hagtvedt et al., Abstract for Color Saturation Increases Perceived Product Size, Jan. 2017 (Year: 2017).*
Trost et al., HSV Color Model, Mar. 2016 (Year: 2016).*
Kumar et al., Using instruments to quantify colour, 2014, Principles of Colour and Appearance Measurement (Year: 2014).*
Machine Translation of JP-2001352852-A, Dec. 2001 (Year: 2001).*
Machine Translation of JP-2017077402-A, Apr. 2017 (Year: 2017).*
Machine Translation of WO-2018207439-A1, Nov. 2018 (Year: 2018).*
PCT International Search Report dated Apr. 10, 2018 for Intl. App. No. PCT/JP2018/006306, from which the instant application is based, 4 pgs.
English Abstract and Machine Translation for Japanese Publication No. 2001008568 A, published Jan. 16, 2001, 15 pgs.
English Abstract and Machine Translation for Japanese Publication No. JPH11189961 A, published Jul. 13, 1999, 23 pgs.
English Abstract and Machine Translation for Japanese Publication No. 2013179858 A, published Sep. 12, 2013, 17 pgs.
English Abstract and Machine Translation for Japanese Publication No. 2011205970 A, published Oct. 20, 2011, 14 pgs.
English Abstract and Machine Translation for Japanese Publication No. 2011181420 A, published Jul. 3, 2001, 35 pgs.
English Abstract and Machine Translation for Japanese Publication No. 2006238745 A, published Sep. 14, 2006, 13 pgs.
Untranslated Office Action mailed by Chinese Patent Office for Application No. CN201880039466.9, dated May. 20, 2021, 10 pages.
English Machine Translation of Office Action mailed by Chinese Patent Office for Application No. CN201880039466.9, dated May 20, 2021, 5 pages.
Japanese Patent Application No. 2017-118129, Notice of Reasons for Refusal dated Feb. 18, 2020, 3 pages.
English Machine Translation of Notice of Reasons for Refusal for Japanese Patent Application No. 2017-118129, dated Feb. 18, 2020, 3 pgs.
English Abstract and Machine Translation for Chinese Publication No. CN103476248A, published Dec. 25, 2013, 27 pgs.
English Abstract and Machine Translation for Chinese Publication No. CN104411159A, published Mar. 11, 2015, 29 pgs.
English Abstract and Machine Translation for Chinese Publication No. CN104853598A, published Aug. 19, 2015, 48 pgs.
English Abstract and Machine Translation for Chinese Publication No. CN104918480A, published Sep. 16, 2015, 66 pgs.
English Machine Translation of Second Office Action mailed by Chinese Patent Office for Application No. CN201880039466.9, dated Oct. 15, 2021, 5 pages.
Untranslated Second Office Action mailed by Chinese Patent Office for Application No. CN201880039466.9, dated Oct. 15, 2021, 5 pages.
English Machine Translation of Chinese Office Action for Chinese Application No. 201880039495.5, dated Mar. 3, 2021, 7 pgs.
Untranslated Chinese Office Action for Chinese Application No. 201880039495.5, dated Mar. 3, 2021, 7 pgs.
English Machine Translation of Notification of Reasons for Refusal mailed by Japan Patent Office (JPO) for Application No. JP2017-202014, dated May 19, 2020, 4 pgs.
Untranslated Notification of Reasons for Refusal mailed by Japan Patent Office (JPO) for Application No. JP2017-202014, dated May 19, 2020, 3 pgs.
PCT International Search Report dated Apr. 10, 2018 for Intl. App. No. PCT/JP2018/006305,, 4 pgs.
English Machine Translation of Japanese Publication No. 2015-112268 A, published Jun. 22, 2015, 38 pgs.
English Machine Translation of Japanese Publication No. 2014-097241 A, published May 29, 2014, 24 pgs.
English Abstract and Machine Translation of Japanese Publication No. 2012-213337A, published Nov. 8, 2012, 20 pgs.
English Abstract and Machine Translation of Japanese Publication No. 2006-238744 A, published Sep. 14, 2006, 22 pgs.
English Abstract and Machine Translation of Chinese Publication No. CN1644037 A, published Jul. 27, 2005, 12 pgs.
English Machine Translation of Japanese Publication No. 2005-152241 A, published Jun. 16, 2005, 14 pgs.
English Machine Translation of Japanese Publication No. 2000-255145 A, published Aug. 15, 2000, 28 pgs.
Untranslated Office Action mailed by Chinese Patent Office for Application No. CN201880039495.5, dated May 26, 2021, 9 pages.
English Machine Translation of Office Action mailed by Chinese Patent Office for Application No. CN201880039495.5, dated May 26, 2021, 9 pages.
Untranslated Decision of Refusal dated Mar. 7, 2022 in Chinese Application No. 201880039466.9 with English Machine Translation, 4 pgs.
English Machine Translation of Decision of Refusal dated Mar. 7, 2022 in Chinese Application No. 201880039466.9 with English Machine Translation, 4 pgs.

* cited by examiner

ABSORBENT SHEET FOR PETS

RELATED APPLICATIONS

This application is a 35 U.S.C. 371 national stage filing from international application No. PCT/JP2018/006306, filed Feb. 21, 2018, which claims priority to Japanese Application No. 2017-118129, filed Jun. 15, 2017, the teachings of which are incorporated herein by reference.

TECHNICAL FIELD

The present invention relates to an absorbent sheet for pets that absorbs pet excreta such as urine.

BACKGROUND ART

An absorbent sheet for pets that absorbs pet excreta such as urine is known (see Patent Literature 1 and Patent Literature 2 below). The absorbent sheet for pets includes a liquid-impermeable backsheet, a liquid-permeable topsheet, and an absorber positioned between the backsheet and the sheet.

Patent Literature 1 discloses an absorbent sheet for pets provided with a topsheet to which a chemical solution containing at least one of a fragrance component, a deodorizing component, and a sterilizing component is attached.

Patent Literature 2 discloses an absorbent sheet for pets having a pH determination portion formed of a functional ink that functions by moisture. This pH determination portion is provided on the topsheet or the sheet body adjacent to the back side of the topsheet.

CITATION LIST

Patent Literature

Patent Literature 1: JP 2006-238745 A
Patent Literature 2: JP 2013-179858 A

SUMMARY OF INVENTION

In Patent Literature 1 and Patent Literature 2, a functional material such as a fragrance component, a deodorizing component, a sterilizing component, or a functional ink is provided on the topsheet or a sheet adjacent to the topsheet.

However, when the pet scratches the surface of the absorbent sheet for pets, the functional material may flow out from a scratch or a tear of the topsheet. Therefore, before continuing to use the absorbent sheet for pets for a long period of time during which the pet performs the excretion action a plurality of times, the function of the functional material may deteriorate.

Therefore, an absorbent sheet for pets that can suppress the outflow of the functional material is desired.

BRIEF DESCRIPTION OF DRAWINGS

An absorbent sheet for pets according to an embodiment includes a topsheet, a backsheet, an absorber provided between the topsheet and the backsheet, a functional material, and a recess that is recessed in a direction from the topsheet toward the backsheet. The functional material is provided at a position of the recess.

Figure 1:
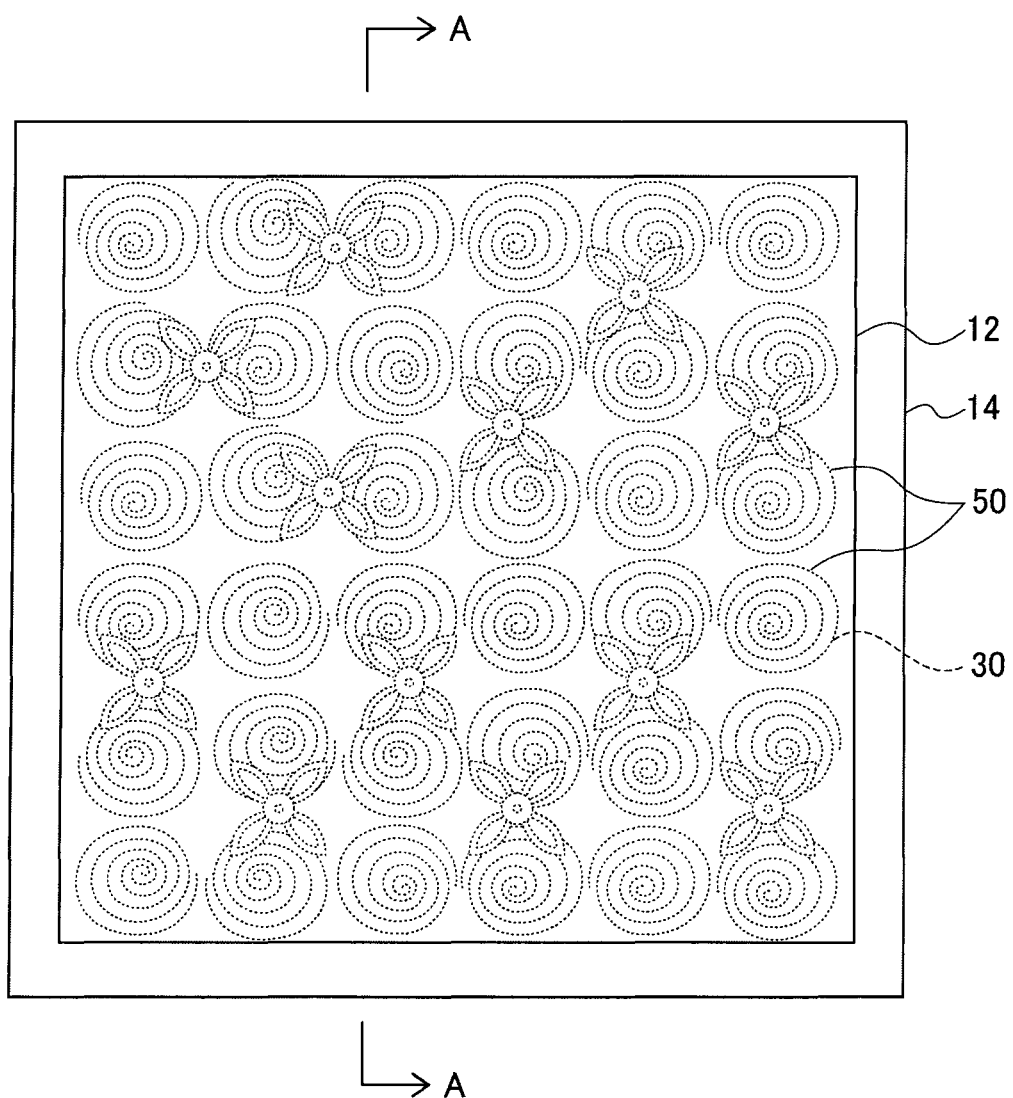
FIG. 1 is a plan view of an absorbent sheet for pets according to a first embodiment.

DESCRIPTION OF EMBODIMENTS (1) Outline of Embodiment

At least the following matters will become apparent from the description of the present specification and the accompanying drawings.

According to a preferred embodiment, an absorbent sheet for pets includes a topsheet, a backsheet, an absorber provided between the topsheet and the backsheet, a functional material, and a recess that is recessed in a direction from the topsheet toward the backsheet. The functional material is provided at a position of the recess.

According to this aspect, the functional material is provided at the position of the recess. In other words, the functional material is provided at a position recessed relative to the outermost top face of the absorbent sheet for pets. Therefore, even when the pet scratches the outermost top face of the absorbent sheet for pets, the outflow of the functional material can be suppressed.

According to a preferred embodiment, the functional material is provided closer to the absorber than to the topsheet at the position of the recess.

According to this aspect, since the functional material is provided closer to the absorber than to the topsheet, even when the pet scratches the outermost top face of the absorbent sheet for pets, the outflow of the functional material can be further suppressed.

According to a preferred embodiment, the recess is formed by at least an embossed portion obtained by compressing the absorber.

The embossed portion is generally formed by compressing at least the absorber with the projection of the emboss roller. By applying a functional material to the projection of the emboss roller, the functional material can be accurately transferred to the position of the embossed portion. That is, the functional material can be easily transferred accurately to the embossed portion by forming the recess with the embossed portion.

According to a preferred embodiment, the functional material includes a water resistant agent. A water resistant agent can control the diffusion of pet excreta. In this aspect, the water resistant agent is provided at the position of the recess and is located inside in the thickness direction. Therefore, it is possible to prevent excreta absorbed by the absorber from spreading in a circular shape inside the absorber.

Also, when it is possible to suppress the spread of excreta which was discharged once, it is possible to secure a region that has not absorb excreta, so that the pet can perform the excretion action again in the region that has not absorbed excreta. For example, a pet such as dogs has the habit of not performing the excretion action again where urinary traces are visible. Therefore, when the diffusion of excreta can be appropriately controlled by the water resistant agent and the pattern of the recesses, the absorbent sheet for pets can be continuously used for a long period of time during which the excretion action is performed a plurality of times.

According to a preferred embodiment, the water resistant agent includes a water resistant resin. According to this aspect, a coating film of the water resistant agent can be easily formed at the position of the recess by solidifying the resin by volatilization/drying after discharging the solvent containing the resin to the recess.

According to a preferred embodiment, the functional material has hydrophobicity. In general, when the absorbent sheet for pets absorbs pet excreta, for example, urine, the region that has absorbed the excreta has a dull color. In this aspect, by providing a functional material having hydrophobicity at the position of the recess, the void between the fibers on the surface of the recess is covered with the functional material, and it is difficult to absorb the excreta at the position of the recess. Therefore, even when the absorbent sheet for pets absorbs excreta, there is a difference in appearance between the position of the recess and the region around the recess. As a result, the user can distinguish easily the region which is wet with excreta, and the region which is not wet. The user can easily recognize the timing of replacing the absorbent sheet for pets by recognizing the wet region and the non-wet region.

According to a preferred embodiment, the functional material includes a colorant. According to this aspect, since the colorant is provided at the position of the recess, a color difference occurs between the position of the recess and the region around the recess when viewed from the topsheet. This color difference makes it easier for the user to recognize the depth of the recess, and hence the thickness of the absorbent sheet for pets. When the user feels that the absorbent sheet for pets is thick, it is possible to give the user a sense of security that the absorbent sheet for pets can withstand the excretion action a plurality of times.

According to a preferred embodiment, a difference between a saturation at a position of the recess and a saturation at a region around the recess when viewed from the topsheet is 10% or more. This makes it easier to recognize the color difference between the position of the recess and the region around the recess, and thus makes it easier to feel the thickness of the absorbent sheet for pets.

According to a preferred embodiment, the saturation at the position of the recess is higher than the saturation at the region around the recess. By making the color at the position of the recess more vivid than the region around the recess, it is easier to recognize the color difference between the position of the recess and the region around the recess, and therefore, it is easier to feel the thickness of the absorbent sheet for pets.

According to a preferred embodiment, the saturation at the region around the recess is less than 5%. As a result, the region around a recess becomes substantially achromatic. Accordingly, a recess having more vivid saturation is disposed in the background of the achromatic color, and the user feels the depth of the recess deeper due to the illusion effect. Therefore, the thickness of the absorbent sheet for pets can be easily felt by the user.

According to a preferred embodiment, part of the backsheet extends outward of the topsheet. A difference between the saturation at the position of the recess and a saturation of the backsheet is less than 5%. By making the saturation at the position of the recess close to the saturation of the backsheet, the user can feel that the bottom of the recess is close to the position of the backsheet in the thickness direction. This makes the user feel that the thickness of the recess is thick, so that the thickness of the absorbent sheet for pets can be more easily felt by the user.

According to a preferred embodiment, part of the backsheet extends outward of the topsheet. A difference between a hue at the position of the recess and a hue of the backsheet is less than 30 degrees.

According to this aspect, by bringing the hue at the position of the recess close to the hue of the backsheet, the user can feel that the bottom of the recess is close to the position of the backsheet in the thickness direction. This makes the user feel that the thickness of the recess is thick, so that the thickness of the absorbent sheet for pets can be more easily felt by the user.

(2) Configuration of Absorbent Sheet for Pets

Hereinafter, the absorbent sheet for pets according to the embodiment will be described with reference to the drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings.

In the present specification, "pet" broadly encompasses vertebrates and invertebrates, and typically includes pets such as cats, dogs, rabbits, and hamsters.

Figure 2:
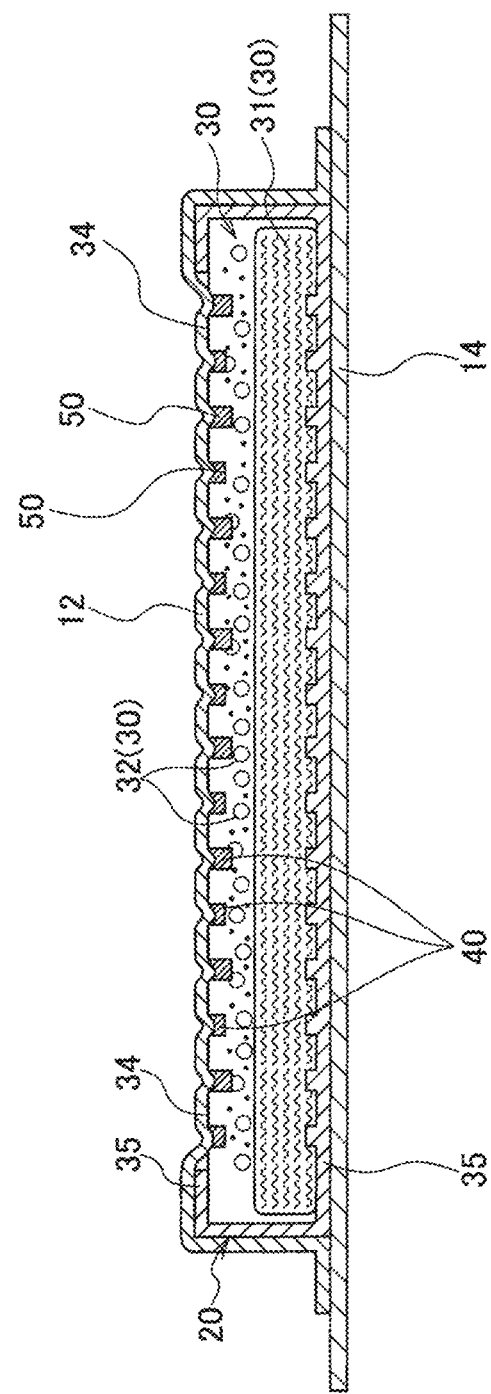
FIG. 2 is a schematic cross-sectional view of the absorbent sheet for pets taken along line A-A shown in FIG. 1.

FIG. 1 is a plan view of the absorbent sheet for pets according to the first embodiment. FIG. 2 is a schematic cross-sectional view of the absorbent sheet for pets taken along line A-A shown in FIG. 1. An absorbent sheet for pets 10 is a generally flat sheet. One face of the absorbent sheet for pets 10 is a face that receives pet excreta, and is also referred to as an "excretion face" below. FIG. 1 is a plan view of the absorbent sheet for pets as seen from the excretion face.

The absorbent sheet for pets 10 includes a topsheet 12 disposed on the top side, a backsheet 14 disposed on the back side, and an absorber 20. The absorber 20 is provided between the topsheet 12 and the backsheet 14.

The topsheet 12 may be a liquid-permeable sheet that liquid such as pet excreta permeates. The liquid-permeable sheet may be composed of, for example, a liquid-permeable nonwoven fabric or an opening film.

The backsheet 14 may be a liquid-impermeable sheet that liquid such as pet excreta does not permeate. The backsheet 14 is not particularly limited, but may be composed by, for example, a resin film sheet.

In the present embodiment, part of the backsheet 14 extends outward of the topsheet 12. Therefore, the backsheet 14 can be visually recognized from the excretion face for the outer peripheral portion of the absorbent sheet for pets 10.

The absorber 20 may include an absorbent core 30 and a core wrap 33 that wraps the absorbent core 30. The core wrap 33 may include a cover layer 34 that covers the excretion face side of the absorbent core 30, and a wrap layer 35 that covers the side face and the back face of the absorbent core 30. In this case, the absorbent core 30 is wrapped by the cover layer 34 and the wrap layer 35. The cover layer 34 and the wrap layer 35 are not particularly limited, but can be composed of, for example, a liquid-permeable tissue.

The absorbent core 30 may include, but is not limited to, a hydrophilic fiber 31 such as pulp, and a super absorbent polymer (SAP) 32, or a combination thereof. As an example, in the present embodiment, the super absorbent polymer (SAP) 32 is provided on the hydrophilic fiber layer 31. The hydrophilic fiber layer 31 may be wrapped with a tissue layer (not shown).

The absorbent sheet for pets 10 has a recess 50 that is recessed in a direction from the topsheet 12 toward the backsheet 14. Hereinafter, this recess 50 is referred to as a "top recess 50" for convenience. The top recess 50 may be formed at least on the absorber 20.

At least one top recess 50 may be provided on the absorber 20. In the present embodiment, a large number of dot-shaped top recesses 50 are provided. These dot-like top recesses 50 may be arranged so as to form an intermittent line. Alternatively, the top recesses 50 may extend linearly or curvilinearly to form a continuous line.

The top recess 50 may be formed by at least an embossed portion obtained by compressing the absorber 20. This embossed portion may be formed by compressing only the absorber 20, or may be formed by compressing both the absorber 20 and the topsheet 12. When the top recess 50 is formed by an embossed portion, the density of the absorber 20 at the position of the top recess 50 is higher than the density of the absorber 20 around the top recess 50.

Alternatively, the top recess 50 may be configured by lowering at least the basis weight of the absorber 20. In this case, the basis weight of the absorber 20 at the position of the top recess 50 may be lower than the basis weight of the absorber 20 around the top recess 50.

The absorbent sheet for pets 10 has a functional material 40. The functional material 40 may include a water resistant agent, a colorant or a drug, or a combination thereof. The water resistant agent may contain, for example, a water resistant resin. As an example of the water resistant agent, an acrylic water resistant resin can be used. When the water resistant agent contains a water resistant resin, a coating film of the water resistant agent can be easily formed at the position of the top recess 50 by solidifying the resin by volatilization/drying after discharging the solvent containing the resin to the recess.

The colorant may be composed of any agent that can color the position of the top recess 50. The colorant may be hydrophilic or hydrophobic. Preferably, the colorant has a hydrophobic or a water resistant agent.

The functional material 40 is provided at the position of the top recess 50. Preferably, the functional material 40 is provided closer to the absorber 20 than the topsheet 12 at the position of the top recess 50. In the present embodiment, the functional material 40 is provided on the cover layer 34 constituting the absorber 20 at the position of the top recess 50 as an example.

The functional material 40 is provided at the position of the top recess 50, in other words, at a position recessed relative to the outermost top face of the absorbent sheet for pets 10. Therefore, even when the pet scratches the outermost top face of the absorbent sheet for pets 10, the outflow of the functional material 40 can be suppressed.

When the functional material 40 is provided on the top recess 50, the top recesses 50 are preferably formed by at least an embossed portion obtained by compressing the absorber 20. The embossed portion is generally formed by compressing at least the absorber 20 with a projection formed on the emboss roller. By applying the functional material 40 to the projection of the emboss roller, the functional material 40 can be accurately transferred to the position of the embossed portion. That is, the functional material 40 can be easily transferred accurately to the embossed portion with the top recess 50 formed by the embossed portion.

In one aspect, the functional material 40 preferably includes a water resistant agent. A water resistant agent can control the diffusion of pet excreta. In this aspect, the water resistant agent is provided at the position of the top recess 50, and is present at a position recessed relative to the top face of the absorber 20 in the thickness direction. Therefore, it is possible to prevent excreta absorbed by the absorber 20 from spreading in a circular shape inside the absorber 20.

When it is possible to suppress the spread of excreta which was discharged once, it is possible to secure a region that has not absorb excreta, so that the pet can perform the excretion action again in the region that has not absorbed excreta. For example, a pet such as dogs has the habit of not performing the excretion action again where urinary traces are visible. Therefore, when the diffusion of excreta can be appropriately controlled by the water resistant agent and the pattern of the top recesses 50, the absorbent sheet for pets 10 can be continuously used for a long period of time during which the excretion action is performed a plurality of times.

In order to exhibit such an effect more, it is preferable that the top recesses 50 be provided so as to form a continuous or intermittent line. In this specification, the "intermittent line" is defined by an imaginary line that connects the top recesses 50 that are close enough to be regarded as an "intermittent line" by the user's vision. In particular, the imaginary line is defined by a line connecting a top recess 50 that exists at a position away from a specific top recess 50 by a distance not more than 1.5 times the distance between the specific top recess 50 and a top recess 50 closest to the specific top recess 50 and the specific top recess 50. Further, as an example, the imaginary line may be defined by a line connecting the top recesses 50 having an interval of 1 cm or less, more preferably 5 mm or less therebetween.

The functional material 40 may have hydrophobicity. In general, when the absorbent sheet for pets 10 absorbs pet excreta, for example, urine, the region that has absorbed the excreta has a dull color. In this aspect, by providing a functional material 40 having hydrophobicity at the position of the top recess 50, the void between the fibers on the surface of the top recesses 50 is covered with the functional material 40, and it is difficult to absorb the excreta at the position of the top recess 50. Therefore, even when the absorbent sheet for pets 10 absorbs excreta, there is a difference in appearance between the position of the top recess 50 and the region around the top recess 50. As a result, the user can distinguish easily the region which is wet with excreta, and the region which is not wet. The user can easily recognize the timing of replacing the absorbent sheet for pets 10 by recognizing the wet region and the non-wet region.

According to one aspect, the functional material 40 preferably includes a colorant. When the colorant is provided at the position of the top recess 50, a color difference occurs between the position of the top recesses 50 and the region around the top recesses 50 when viewed from the topsheet 12 side. This color difference makes it easier for the user to recognize the depth of the top recess 50, and hence the thickness of the absorbent sheet for pets 10. When the user feels that the absorbent sheet for pets 10 is thick, it is possible to give the user a sense of security that the absorbent sheet for pets 10 can withstand the excretion action a plurality of times.

The colorant can give a difference between the saturation at the position of the top recess 50 and the saturation at the region around the top recess 50 of the absorbent sheet for pets 10. When viewed from the topsheet 12 side, the saturation at the position of the top recess 50 is preferably higher than the saturation at the region around the top recess 50. By making the color at the position of the top recess 50 vivid than that at the region around the top recess 50, the user can more easily recognize the color difference between the position of the top recesses 50 and the region around the top recess 50. Therefore, the user can more easily feel the thickness of the absorbent sheet for pets 10.

The saturation at the region around the top recess 50 is preferably less than 5%. In the present specification, hue, saturation, and lightness are defined by the HSV color space (also referred to as HSB color space) (hereinafter the same applies). As a result, the region around the top recess 50 becomes achromatic. Accordingly, the top recesses 50 having more vivid saturation is arranged in the background region of the achromatic color. As a result, the user feels the depth of the top recess 50 deeper due to the illusion effect. Therefore, the thickness of the absorbent sheet for pets 10 can be easily felt by the user.

Furthermore, when the top recess 50 having more vivid saturation is arranged in the region of the white background, the user feels the depth of the top recess 50 deeper due to the illusion effect. From such a viewpoint, it is more preferable that the region around the top recess 50 be substantially white. For example, it is preferable that the saturation at the region around the top recess 50 be less than 5% and the lightness is 90% or more.

The difference between the saturation at the position of the top recess 50 and the saturation at the region around the top recess 50 when viewed from the topsheet is preferably relatively large, specifically 10% or more. As a result, the user can more easily recognize the color difference between the position of the top recess 50 and the region around the top recess 50, and thereby, can more easily feel the thickness of the absorbent sheet for pets 10.

When part of the backsheet 14 extends outward of the topsheet 12, the difference between the saturation at the position of the top recess 50 and the saturation of the backsheet 14 is preferably relatively small, specifically less than 5% when viewed from the excretion face. By bringing the saturation at the position of the top recess 50 close to the saturation of the backsheet 14, the user can feel that the bottom of the top recess 50 is close to the position of the backsheet 14 in the thickness direction. This makes the user feel that the thickness of the top recess 50 is thick, so that the thickness of the absorbent sheet for pets 10 can be more easily felt by the user.

When viewed from the excretion face side, the difference between the hue at the position of the top recess 50 and the hue of the backsheet 14 is preferably relatively small, specifically less than 30 degrees. By bringing the hue at the position of the top recess 50 close to the hue of the backsheet 14, the user can feel that the bottom of the top recess 50 is close to the position of the backsheet 14 in the thickness direction. This makes the user feel that the thickness of the top recess 50 is thick, so that the thickness of the absorbent sheet for pets 10 can be more easily felt by the user.

The hue, saturation, and lightness in the HSV color space can be validated by visual comparison with a color sample prepared in advance.

Next, the results of sensory evaluation of the absorbent sheet for pets will be described with reference to Comparative Examples 1 and 2 and Examples 1 to 4. Comparative Example 1 is an absorbent sheet for pets that does not include the colorant as the functional material 40 and the top recesses 50. Other configurations of the absorbent sheet for pets of Comparative Example 1 are the same as those of the absorbent sheet for pets 10 shown in FIGS. 1 and 2.

Comparative Example 2 is an absorbent sheet for pets that has the top recesses 50 but does not contain a colorant as the functional material 40. Other configurations of the absorbent sheet for pets of Comparative Example 2 are the same as those of the absorbent sheet for pets 10 shown in FIGS. 1 and 2.

Examples 1 to 4 are the absorbent sheet for pets 10 including the top recesses 50 and a colorant as the functional material 40. The thicknesses of the absorbent sheet for pets according to Comparative Examples 1 and 2 and Examples 1 to 4 are all the same.

Here, in Comparative Examples 1 and 2 and Examples 1 to 4, the topsheet 12 is white, the saturation of the topsheet 12 itself is 0%, and the lightness of the topsheet 12 itself is 100%. Therefore, in Comparative Example 2, the saturation at the position of the top recesses 50 is 0%, and the lightness at the position of the top recesses 50 is 100%.

In Examples 1 to 4, the saturation and the hue at the position of the top recesses 50 are different from those of Comparative Example 2 due to the colorant as the functional material 40. Specifically, in Examples 1 to 4, the lightness at the position of the top recesses 50 is 100%.

In Examples 1 and 3, the saturation at the position of the top recesses 50 is 10%. In Examples 2 and 4, the saturation at the position of the top recesses 50 is 50%. In Examples 1 and 2, the hue at the position of the top recesses 50 is 155 degrees. Furthermore, in Examples 3 and 4, the hue at the position of the top recesses 50 is 280 degrees.

The sensory evaluation was performed as follows. Ten people compared each of the absorbent sheet for pets according to Comparative Example 2 and Examples 1 to 4 with the absorbent sheet for pets according to Comparative Example 1. As a result, whether the respective absorbent sheet for pets according to Comparative Example 2 and Examples 1 to 4 "look thick", "look unchanged in thickness", or "look thin", compared with the absorbent sheet for pets of Comparative Example 1 was evaluated. In Table 1 below, the number of people who answered "look thicker", "look unchanged in thickness", or "look thinner" is shown.

TABLE 1

|  |  | Comparative Example 1 | Comparative Example 2 | Example 1 | Example 2 |
| --- | --- | --- | --- | --- | --- |
|  | Top recess | None | Present | Present | Present |
|  | Colorant | None | None | Present | Present |
|  | Saturation at the position of the top recess | — | 0% | 10% | 50% |
|  | Lightness at the position of the top recess | — | 100% | 100% | 100% |
|  | Hue at the position of the top recess | — | — | 155 degrees | 155 degrees |
| Sensory evaluation results | Look thicker | — | 4 | 10 | 9 |
|  | Look unchanged | — | 5 | 0 | 1 |
|  | Look thinner | — | 1 | 0 | 0 |

As a result of the sensory evaluation, the number of people who answered that the absorbent sheet for pets (Examples 1 to 4) including the top recesses 50 and the colorant as the functional material 40 look thicker than the sheet of Comparative Example 1 has increased significantly. That is, it has been found that by providing a colorant at the position of the top recesses 50, the user can recognize that the absorbent sheet for pets is thicker. In addition, from the results of Examples 1 to 4, when the difference between the saturation at the position of the top recesses 50 and the saturation around the top recesses 50 when viewed from the topsheet is 10% or more, it has been found that the user can feel the thickness of the absorbent sheet for pets sufficiently.

As mentioned above, although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

Note that the entire contents of Japanese Patent Application No. 2017-118129 filed on Jun. 15, 2017 are incorporated by reference herein.

INDUSTRIAL APPLICABILITY

According to the above aspect, the absorbent sheet for pets which can suppress the outflow of a functional material can be provided.

REFERENCE SIGNS LIST

10: pets
12: topsheet
14: backsheet
20: absorber
30: absorbent core
40: functional material
50: recess

The invention claimed is:

1. An absorbent sheet for pets comprising:
a topsheet having a first surface forming an excretion face and a second surface opposite to the first surface;
a backsheet;
an absorber provided between the topsheet and the backsheet wherein a top surface of the absorber faces the second surface of the top sheet;
a functional material with hydrophobicity or water resistance; and
an embossed portion formed along the top surface of the absorber by compressing only the absorber wherein the embossed portion is recessed in a direction away from the top surface of the absorber toward the backsheet, wherein
at a position of the embossed portion, the functional material is provided on the embossed portion of the absorber
the embossed portion is dot-shaped, and
a plurality of the embossed portion is arranged so as to form intermittent lines in a plan view of the absorbent sheet, and
the intermittent lines are spiral.

2. The absorbent sheet for pets according to claim 1, wherein the functional material includes a water resistant agent.

3. The absorbent sheet for pets according to claim 2, wherein the water resistant agent includes a water resistant resin.

4. The absorbent sheet for pets according to claim 1, wherein the functional material includes a colorant.

5. The absorbent sheet for pets according to claim 4, wherein a difference between a saturation defined by a HSV color space at a position of the recess and a saturation defined by a HSV color space at a region around the recess when viewed from the topsheet is 10% or more.

6. The absorbent sheet for pets according to claim 4, wherein the saturation defined by a HSV color space at the position of the recess is higher than the saturation defined by a HSV color space at the region around the recess.

7. The absorbent sheet for pets according to claim 4, wherein the saturation defined by a HSV color space at the region around the recess is less than 5%.

8. The absorbent sheet for pets according to claim 4, wherein
part of the backsheet extends outwardly than the topsheet in a plan view of the absorbent sheet, and
a difference between the saturation defined by a HSV color space at the position of the recess and a saturation defined by a HSV color space of the backsheet is less than 5%.

9. The absorbent sheet for pets according to claim 4, wherein
part of the backsheet extends outwardly than the topsheet in a plan view of the absorbent sheet, and
a difference between a hue defined by a HSV color space at the position of the recess and a hue defined by a HSV color space of the backsheet is less than 30 degrees.

10. The absorbent sheet for pets according to claim 1, wherein the functional material includes a water resistant agent.

11. The absorbent sheet for pets according to claim 5, wherein the saturation at the position of the recess is higher than the saturation at the region around the recess.

12. The absorbent sheet for pets according to claim 5, wherein the saturation at the region around the recess is less than 5%.

13. The absorbent sheet for pets according to claim 5, wherein
part of the backsheet extends outwardly than the topsheet in a plan view of the absorbent sheet, and
a difference between the saturation at the position of the recess and a saturation of the backsheet is less than 5%.

14. The absorbent sheet for pets according to claim 5, wherein
part of the backsheet extends outwardly than the topsheet in a plan view of the absorbent sheet, and
a difference between a hue defined by a HSV color space at the position of the recess and a hue defined by a HSV color space of the backsheet is less than 30 degrees.

* * * * *